Feb. 22, 1966   D. H. HUBBLE ETAL   3,235,936
METHOD OF PRODUCING STAINLESS-CLAD STEEL PLATE
Filed June 21, 1963

INVENTORS.
DAVID H. HUBBLE and
EUGENE N. SILVERMAN
By Donald G. Dalton
Attorney

United States Patent Office 3,235,936
Patented Feb. 22, 1966

3,235,936
METHOD OF PRODUCING STAINLESS-CLAD STEEL PLATE
David H. Hubble, Pitcairn Borough, Pa., and Eugene N. Silverman, Youngstown, Ohio, assignors to U.S. Steel Company, a corporation of Delaware
Filed June 21, 1963, Ser. No. 289,602
4 Claims. (Cl. 29—19)

The present invention relates to the production of carbon steel plate clad with stainless steel and more particularly to an improved method for providing such clad plate from a composite ingot which is readily separable after rolling.

As described in the Ingersoll Patent No. 1,868,749, an economical method for producing stainless-clad plates includes the steps of joining two stainless-steel plates having a separating medium therebetween by welding along their edges. The resulting sandwich assembly is then positioned vertically in the center of an ingot mold, and carbon steel is cast around it to form a composite ingot having the sandwich assembly extending vertically through the center thereof. The mold is then stripped from the ingot, and the ingot is hot rolled to the desired thickness. The product is sheared into plates, which are then side sheared to remove the welded areas at the edges. The plates will then separate along the area of their cross section comprising the separating-medium layer to form the desired stainless-clad steel plate.

Materials conventionally used as the separating medium include alumina ($Al_2O_3$), magnesium oxide (MgO), and chromium oxide ($Cr_2O_3$). They are applied either in a slurry or in dry form to provide a layer of the material between the adjacent surfaces of the stainless steel plates. Since the medium is not continuous it separates as the ingot elongates during hot rolling of the composite ingot, to leave areas of metal-to-metal contact between the adjacent surfaces of the stainless steel plates. Such areas tend to weld together during the hot rolling and thus subsequent separation thereof is difficult if not impossible.

Accordingly, it is an object of our invention to provide a method for producing a composite ingot that may be easily separated into stainless-clad plates after hot rolling.

A more particular object of our invention is to modify the conventional method of producing composite ingots by providing a separating-medium layer that during hot rolling elongates with the ingot and thus remains continuous to provide for easy separation upon cooling.

Figure 1:
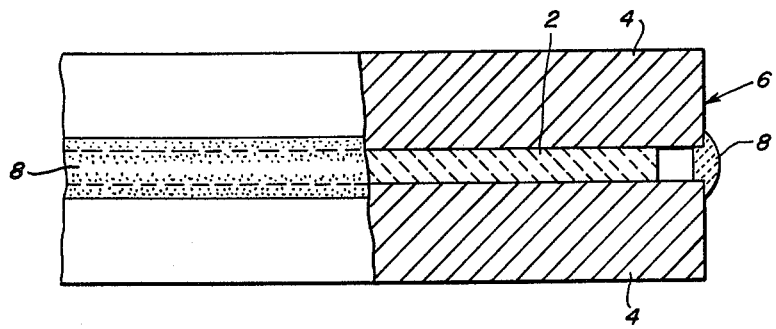
Figure 2:
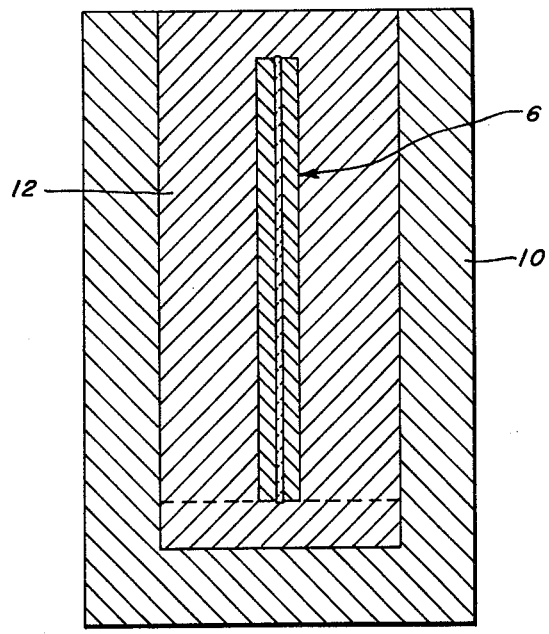

The foregoing and further objects will be apparent from the following specification when read in conjunction with the attached drawing wherein:

FIGURE 1 is an enlarged elevational view partly broken away of a core assembly embodying our invention; and FIGURE 2 is a sectional view of an ingot mold embodying the core assembly of FIGURE 1.

We accomplish these objects by using a glass plate as the separating medium to replace the granular materials conventionally used for this purpose. During hot rolling, the glass increases in area with the steel and thus provides a continuous separating layer between the adjacent surfaces of the stainless steel plates. This prevents metal-to-metal contact and thus welding of the adjacent surfaces to provide for easy separation of the stainless steel plates upon cooling. In addition, the steel plates contract to a greater extent than the glass during cooling to break any bond that may have formed between the materials when they were at elevated temperatures.

As shown in FIGURES 1 and 2 of the drawing, a sheet of glass 2 is disposed between a pair of stainless plates 4 of suitable thickness, such members formed into a core 6 by joining the edges of the stainless steel plates by weld metal 8. Thereafter the core may be disposed in an ingot mold 10 and carbon steel 12 cast therearound.

Many glass compositions are suitable for use with the method of our invention. It is preferred, however, that the viscosity of the glass be such that its temperature softening point (temperature at which the glass flows under its own weight) is lower than the temperature of the ingot during the final rolling pass. Hence, the temperature softening point should be lower than the lowest temperature encountered during hot rolling. It is also preferred that the viscosity of the glass be such that it will not become excessively fluid at the maximum temperature encountered during hot rolling. Excessive fluidity makes confinement of the glass in a sandwich construction difficult and gives rise to a possible reaction of the glass with the stainless steel. The temperatures encountered during hot rolling are usually between 1500 and 2450° F.

The thermal expansion of the glass should be appreciably different from that of the steel to insure easy separation upon cooling. Generally, glass that exhibits thermal expansion sufficiently lower than steel has a high $SiO_2$ content and low $NaO_2$ and $K_2O$ contents.

Many commercially available glasses satisfy the above-mentioned requirements. The following are examples of two widely different glasses that have a thermal expansion of 10 to $3 \times 10^{-6}$ per degree C. (steel—14 to $20 \times 10^{-6}$) and have been used successfully with the method of our invention:

| Glass | Chemical Composition, Percent | | | | | | | | |
|---|---|---|---|---|---|---|---|---|---|
| | $SiO_2$ | $Al_2O_3$ | $Na_2O$ | $K_2O$ | MgO | CaO | BaO | $Fe_2O_3$ | $B_2O_3$ |
| Window Glass | 72.3 | 1.9 | 13.5 | 0.5 | 0.2 | 10.6 | 0.6 | 0.6 | 0.1 |
| Pyrex | 80.5 | 2.2 | 3.8 | 0.4 | *ND | ND | ND | ND | 12.9 |

*ND—Not determined.

The most likely commercial glass would be a common soda-lime-silica glass ($Na_2O$-CaO-$SiO_2$) in the range of 0 to 80% $Na_2O$, 0 to 50% CaO, and 30 to 70% $SiO_2$. Glasses of this type are preferred because of their low cost and availability.

The initial thickness of the glass separating layer should be varied according to the final thickness to which the ingot is reduced during hot rolling. For example, if 0.003 inch of separating glass is desired in a final rolled product reduced to 0.050 of its original thickness, the original thickness of the glass separating layer should be 20×0.003 or 0.060 inch. The final thickness of the separating layer may be varied from 0.001 to 0.20 inch, with a 0.001- to 0.010-inch thickness being preferred.

A specific example of the practice of our invention is as follows: A piece of window glass ⅛ by 9⅝ by 14⅝ inches was placed between two ⅜ by 10 by 15-inch type 304 stainless steel plates. The three sections were joined in a sandwich assembly by welding along the edges of the stainless steel plates. The sandwich assembly was placed vertically in a 5- by 12- by 17-inch ingot mold, and 300 pounds of carbon steel were cast around it.

After stripping the mold, the ingot was heated to 2300° F. and rolled from the original 5-inch thickness to a 2-inch slab. It was then cut into two pieces. The cut edges of each piece were welded to prevent the escape of glass during subsequent rolling, and the pieces were heated to 2300° F. One piece was then rolled to a final gage of ½ inch and the other to ⅛ inch. The rolled pieces were side sheared to remove the welded areas at their edges. Upon cooling, complete separation of both pieces was achieved. The surface of the stainless cladding was bright and smooth indicating that the glass had no detrimental effect on the stainless steel.

While we have shown and described several specific embodiments of our invention, it will be understood that these embodiments are merely for the purpose of illustration and description and that various other forms may be devised within the scope of our invention, as defined in the appended claims.

We claim:

1. The method of making stainless steel clad steel plate comprising separating a pair of stainless steel plates with a plate of glass, joining the edges of the stainless steel plates by a weldment, placing carbon steel backing plates in contact with the stainless steel plates and rolling said assembly to weld the stainless steel to the carbon steel, the glass plate preventing welding together of the stainless steel plates.

2. The method of forming a composite metallic plate comprising forming a core of juxtaposed metal plates with a plate of glass therebetween, joining by weldment the adjacent edges of said juxtaposed plates, placing said core in a mold and casting metal therearound to form a composite ingot and hot rolling said ingot to form composite metallic plates, the plate of glass maintaining the juxtaposed plates separate and preventing welding of the opposed surfaces thereof during hot rolling of said ingot.

3. A composite for forming bimetallic plates comprising a pair of juxtaposed metal plates, a plate of glass therebetween, the adjacent edges of said metal plates being joined together by weldment to maintain the glass plate between said metal plates during rolling therof.

4. A composite for forming bimetallic plates comprising a pair of juxtaposd metal plates, a plate of glass therebetween, the adjacent edges of said metal plates being joined together by a weldment to maintain the glass plate between the metal plates, and cast metal around said pair of juxtaposed plates adapted to be welded thereby by rolling of said composite.

References Cited by the Examiner
UNITED STATES PATENTS

| | | | |
|---|---|---|---|
| 2,041,255 | 5/1936 | Marburg | 29—19 |
| 3,066,384 | 12/1962 | Heger | 29—19 |

RICHARD H. EANES, JR., *Primary Examiner.*